United States Patent [19]
Tiedemann, Jr.

[11] Patent Number: 5,289,527
[45] Date of Patent: Feb. 22, 1994

[54] MOBILE COMMUNICATIONS DEVICE REGISTRATION METHOD

[75] Inventor: Edward G. Tiedemann, Jr., San Diego, Calif.

[73] Assignee: QUALCOMM Incorporated, San Diego, Calif.

[21] Appl. No.: 763,091

[22] Filed: Sep. 20, 1991

[51] Int. Cl.$^5$ ............... H04M 11/00; H04Q 7/00; H04B 1/00
[52] U.S. Cl. ................... 379/59; 379/60; 455/33.1; 455/33.2; 455/54.1; 455/54.2; 455/56.1; 342/450; 342/457; 342/458
[58] Field of Search ............ 379/59, 60; 455/33.1, 455/33.2, 54.1, 54.2, 56.1; 342/450, 457, 458

[56] References Cited

U.S. PATENT DOCUMENTS

| | | | |
|---|---|---|---|
| 4,112,257 | 9/1978 | Frost | 179/2 |
| 4,475,010 | 10/1984 | Huensch et al. | 455/56.1 |
| 4,765,753 | 8/1988 | Schmidt | 379/60 |
| 4,876,738 | 10/1989 | Selby | 455/33.2 |
| 4,977,399 | 12/1990 | Price et al. | 379/59 |
| 5,043,736 | 8/1991 | Darnell et al. | 342/450 |
| 5,054,110 | 10/1991 | Comroe et al. | 379/59 |
| 5,127,100 | 6/1992 | D'Amico et al. | 455/33.1 |

OTHER PUBLICATIONS

"A New Location Updating Method for Digital Cellular Systems", by Sadaatsu Okasaka et al., Proceedings of the 41st IEEE Vehicular Technology Conference, pp. 345–350, St. Louis, Mo. May 19–22, 1991.

Primary Examiner—James L. Dwyer
Assistant Examiner—Vijay Shankar
Attorney, Agent, or Firm—Russell B. Miller; Katherine W. White

[57] ABSTRACT

A distance based method for mobile station registration in a cellular communication system. The mobile station registers whenever it moves into a new cell that is greater than some predefined distance from the previous cell where it registered. Cell base stations transmit corresponding base station location information and a distance value. The mobile station receives the base station location information and computes the distance from a cell in which the mobile station last registered to the current cell in which the mobile station is present. When the computed distance is greater than the distance value associated with the registration cell the mobile station registers. Pages for the mobile station are transmitted within a group of cells within a distance of the registration cell corresponding to the registration cell transmitted distance value.

33 Claims, 2 Drawing Sheets

MOBILE COMMUNICATIONS DEVICE REGISTRATION METHOD

BACKGROUND OF THE INVENTION

I. Field of the Invention

The present invention relates to communications. More particularly, the present invention relates to a novel and improved method for registration of a mobile communications device in a cellular communications environment.

II. Description of the Related Art

In a cellular communication system registration is the process a mobile station uses to notify a cellular communication system whether it is on the air and which cell it is receiving. The mobile station may be of a cellular radiotelephone or personal communication device typically in the form of a vehicle mounted unit or a hand carried portable unit. For calls that are directed towards a mobile station, the cellular system uses the registration information to reduce the amount of paging by determining whether to page a mobile station and, if so, to determine the set of cells to broadcast the page.

For calls directed to a mobile station, often called mobile terminated calls, the land system must determine whether the mobile station is powered on and the cell that the mobile station is receiving. To find the mobile station, the cellular system broadcasts a message, often called a page, in many cells. If the mobile station responds, the cellular system continues handling the call with further communication being directed to the cell containing the mobile station. It should be further understood that the paging process is used to locate the mobile station for any other transaction to be done with the mobile station.

If the system has no knowledge of the location of the mobile station, then the system must broadcast pages in every sector of every cell. As the amount of mobile terminated traffic increases, the communications resources to support system wide paging quickly becomes enormous in most large metropolitan areas.

A mobile station uses a process called registration to inform the cellular system where the mobile station is located. Several systems, such as AMPS and GSM, use a periodic or counter method to determine the location of the mobile station. The counter method is similar to the timer method described herein. Although these methods are far from ideal, they nevertheless can significantly reduce the amount of required paging.

An analysis of the timer method assumes the uniform hexagonal tessellation of the plane or uniform circular cells with radius $r_c$. The same expected number of mobile stations, given by $N_a$, is assumed to be in every cell.

In a cellular system implementing the timer method each mobile station registers every $T_r$ seconds. This requirement can be easily implemented by having the mobile station increment a counter periodically, or increment a counter in response to a global command from the system. By either supplying the maximum value of the counter or varying the increment rate, the system can vary $T_r$. The average registration message rate, $\lambda_{reg}$, per cell is thus given by the following equation:

$$\lambda_{reg} = \frac{N_a}{T_r}. \tag{1}$$

For a mobile terminated call, the system needs to determine the set of cells that the mobile station may have entered. If the mobile station can move at some maximum velocity $v_m$, then the distance that the mobile station could have traveled is $v_m(t-t_r)$ where $t_r$ is the time when the mobile station last registered. Unless the system knows where in the cell the mobile station was located when it registered, the system must assume that the mobile station was on the cell boundary. Unless the system has some direction information, it must assume that the mobile station was moving outward.

For a randomly chosen mobile station, the expected number of cells that must be paged can readily be found. The elapsed time since registration is a uniformly distributed random variable on $[0, T_r]$. Rather than considering the exact result which is discontinuous in the distance, more insight can be obtained by considering a quadratic approximation to the number of cells as function of the distance. The expected number of cells that the mobile station must be paged in, $\overline{M}_s$, is in accordance with the equation:

$$\overline{M}_s = 2 + \sqrt{3} + \left(1 + \frac{\sqrt{3}}{2}\right) T_r \left(\frac{v_m}{r_c}\right) + \frac{1}{3} T_r^2 \left(\frac{v_m}{r_c}\right)^2. \tag{2}$$

The quantity $r_c/v_m$ is the time that a mobile station moving at velocity $v_m$ takes move from the center of a cell to its boundary. If the excess outbound message rate is defined as the expected number of pages other than the answered page plus the expected number of messages that must be sent to acknowledge registrations, then the excess outbound message rate, $\lambda_{ex}$, is determined by the equation:

$$\lambda_{ex} = N_a \lambda_m \alpha_t (\overline{M}_s - p_p) \frac{1 - (1 - p_p)^{M_p}}{p_p} + \lambda_{reg}. \tag{3}$$

where:

$M_p$ is the number of times that a page message is repeated;

$p_p$ is the probability that the page is answered by the mobile station on a particular page repetition; and $N_a \lambda_m \alpha_t$ is the origination rate for mobile terminated calls in a cell.

As the interval between registrations, $T_r$, decreases, the number of cells that must be paged decreases, but the acknowledgement rate increases. Thus some value of $T_r$ minimizes $\lambda_{ex}$.

The main problem with the timer method is that paging must be done in area commensurate with the maximum vehicle velocity. If the region has a few routes that allow high velocity, then the system must use the highest velocity route for determining where to page. Portable units, which normally don't move very fast, may nevertheless be in a fast moving vehicle and cannot be counted as a separate class. Techniques which begin paging in a small region and then expand the paging region if the mobile station does not respond can be used to reduce the amount of paging at the expense of delay.

Another registration technique known as the zone method is also used to reduce the amount of paging in the cellular system. The zone method may simply divide the system into regions called zones. Thus, cells are grouped together to form fixed paging zones. Upon registration in a zone the mobile station is paged at all cell within the zone. The mobile station typically maintains a list of zones that it has recently visited. If the mobile station enters a zone not on the list, it then registers. Therefore as the mobile station travels throughout the system, each time it travels into a new zone it registers.

A variation of the basic zone method is described in the article entitled "A New Location Updating Method for Digital Cellular Systems," by Okasaka, Sadaatsu, Onoe, Seizo, Yasuda, Syuji, and Maebara, Akihiro, Proceedings of the 41st IEEE Vehicular Technology Conference, St. Louis, Mo., May 19-22, 1991, pp. 345-350. In this variation of the zone method, layers of zones are created along with the group of mobile stations divided by parameters, such as mobile station serial number, into which layer of zones the mobile station will register.

An analysis of the zone method again assumes the uniform hexagonal tesselation of the plane or uniform circular cells with radius $r_c$. The same expected number of mobile stations, again given by $N_a$, is assumed to be in every cell.

As mentioned above, in the zone method every cell in a system is assigned to a specific fixed zone. Every cell broadcasts the zone to which it is assigned. The mobile station keeps a list of zones that it has recently visited. Whenever a mobile station enters a zone not on its list, the mobile station registers and adds the zone to the list.

Vehicular traffic theory can be used to estimate the expected peak registration rate for a perimeter cell. If the cell is dominated by one or two main roadways, the rate is relatively easy to compute; otherwise, the computation can be quite tedious. A well known result is that the maximum capacity per lane of traffic on a well designed freeway is about 2000 vehicles per hour and occurs with vehicles moving about 50 km/hour. Good rule of thumb adjustments have been developed for other roadways. If the fraction of vehicles equipped with cellular telephones is known, then the expected peak registration rate can be obtained. For example, if 25% of the vehicles traveling on an 8 lane freeway were equipped with cellular telephones, then the expected peak registration rate for a perimeter cell would be 0.56 registrations per second.

One shortcoming of the zone method arises in the case of where a heavily travelled route, such as a freeway, intersects a zone boundary. In this instance all mobile stations register in the cells on the zone boundary through which the freeway passes. This situation can place a severe loading on the resources of these particular zone boundary located cell. One attempt to resolve this problem is to create a staggered or layered zone arrangement as mentioned above. In the fixed staggered zone arrangement, overlapping zones are created in which the particular zone a mobile station registers in is also a function of a serial or identification number of the mobile station. Such a scheme adds a further level of complexity and may not adequately distribute registrations amongst the cells.

Although the zone method does provide an improvement over timer or counter registration methods in that there is a reduction in cell pagings, there is still a need to reduce pagings even further.

It is therefore an object of the present invention to provide in a cellular communication system a method by which mobile station pagings may be reduced.

It is yet another object of the present invention to provide in a cellular communication system a mobile station registration scheme which provides an improvement in the distribution of mobile station registrations amongst the cells.

SUMMARY OF THE INVENTION

The present invention is a novel and improved method for mobile station registration in a cellular communication system. A distance method is employed in which the mobile station registers whenever it moves into a new cell that is greater than some predefined distance from the previous cell where it registered.

In a cellular communication system mobile stations are paged in the various cells in order to identify the cell in which the mobile station is located for call routing purposes. A mobile telephone switching office directs the page to cells within a determined paging zone for transmission by the respective cell base station. The mobile station, if within the zone and in a condition to receive the pages, responds to the received page. The mobile station responds by transmitting a response message that is received by the cell base station for the cell in which the mobile station is located. The response to the page is relayed by the receiving cell base station to the mobile telephone switching office. The mobile telephone switching office identifies through the relay of the response by the cell base station the cell in which the mobile station is currently located. The mobile telephone switching office routes a call intended for the mobile station to the base station corresponding to the cell in which the mobile station is located.

As the mobile station moves through the network of cells it is desirable to limit the paging to the cells in which the mobile station is most likely within. Mobile station registration enables a group of cells to be identified in which the mobile station would most likely be located. In using a registration method paging for the mobile station need only be performed in the identified group of cells. The present invention provides a distance based method for mobile station registration which provides for a reduction in the number of cells in which paging for the mobile station is required.

In accordance with the distance based registration method of the present invention for each cell in the system each respective cell base station transmits corresponding location information and a distance value. The mobile station receives the cell base station location information and distance value for the cell in which mobile station is currently located. The mobile station computes a distance between the cell base station for the cell in which the mobile station is located, based upon the current cell base station transmitted location information and a previous cell base station location information in which the mobile station previously registered. The mobile station then compares the computed distance with a distance value of the previous cell base station.

The mobile station transmits mobile station registration information to the current cell base station when the computed distance is greater than the previous cell base station distance value. The registration information is relayed on to the mobile telephone switching office where a determination is made of a zone of cells for paging of the mobile station. The paging zone includes the current cell and those cells having a base station within a distance of the current cell in accordance with the current cell base station transmitted distance value.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
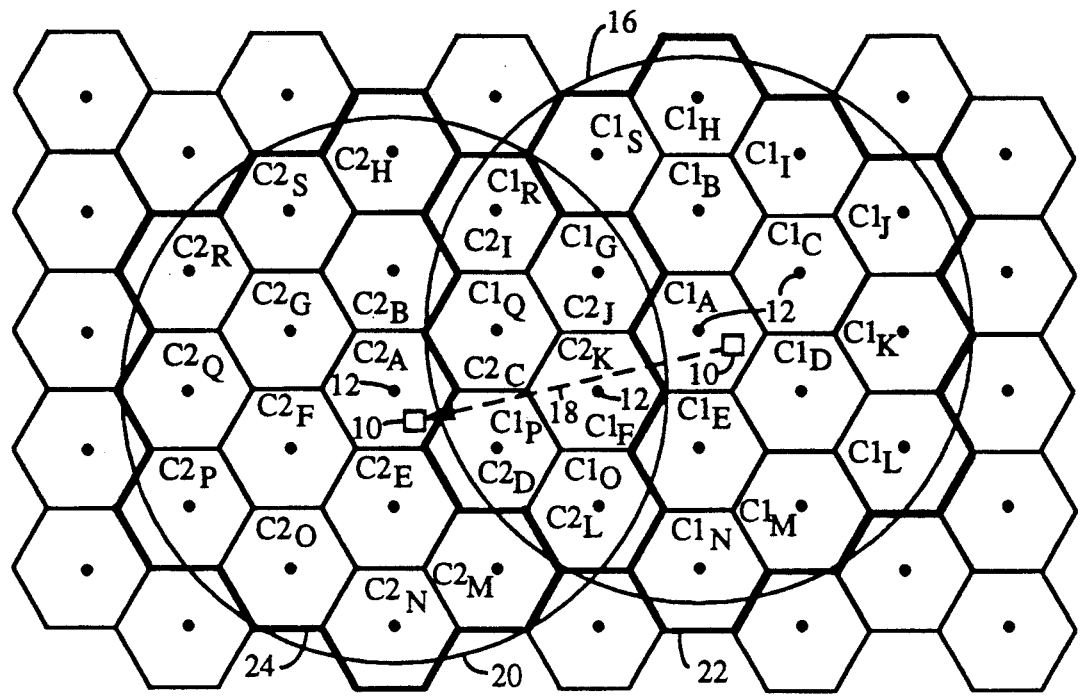
FIG. 1 is a diagram illustrating an exemplary cell structure and mobile station cell paging regions for an initial registration and for a distance travelled based registration.

The distance method of the present invention has a mobile station register whenever it moves more than a given distance from the cell where it last registered. While there are several ways to mechanize this method, a simple way that gives sufficient accuracy has all cells broadcast latitude (lat), longitude (long), and distance ($d_r$) parameters. The mobile station registers whenever:

$$d_r \leq \sqrt{(\Delta lat)^2 + (\Delta long)^2} \tag{4}$$

where:
$d_r$ is the distance parameter transmitted by the cell in which the mobile station last registered.
Furthermore, $$\Delta lat = \text{new lat} - \text{registered lat; and} \tag{5}$$

$$\Delta long = (\text{new long} - \text{registered long}) \cos(\pi/180 \text{ registered lat}); \tag{6}$$

where:
new lat and new long are respectively the latitude and longitude in degrees of the current cell in which the mobile station is located; and
registered lat and registered long are respectively the latitude and longitude in degrees of the cell in which the mobile station last registered.

It should be noted that in equation (6) the cosine factor compensates for the merging lines of longitude as the latitude increases. A more basic approximation of the distance can be achieved be eliminating the cosine factor from equation (6). However without the cosine factor the approximation becomes more inaccurate as the latitude increases. It should be further understood that the distance parameter $d_r$ is typically supplied by the cell where the mobile station last registered. However, in the alternative the distance parameter may be a fixed value stored at the mobile station. It should be further understood that although equations (4)–(6) relate to registrations during the travels of the mobile station, the mobile station also typically registers upon an initial power-up in the system.

The difference between the values (new long) and (registered long), and the difference between the values (new lat) and (registered lat) are respectively typically small for a cellular communications system. Consequently, the approximation set forth by equations (4)–(6) is quite accurate. Errors are less than 1% compared to an exact method, described below, for base station separations up to 200 miles.

In addition, the trigonometric function in equation (4) can be easily approximated by a table lookup function. The square root of the sum of the squares can be approximated by any of several well known approximation methods. One such approximation is:

$$x = \max(|\Delta lat|, |\Delta long|); \text{ and} \tag{7}$$

$$y = \min(|\Delta lat|, |\Delta long|) \tag{8}$$

where:

$$\text{for } 0 \leq y \leq \frac{x}{4} : \text{distance} = x + \frac{1}{8} y; \text{ and} \tag{9}$$

$$\text{for } \frac{x}{4} \leq y : \text{distance} = \frac{7}{8} x + \frac{1}{2} y \tag{10}$$

The approximation of equations (7)–(10) supplies a peak error of less than 3% and average RMS errors of about 1%. The approximation can be computed quickly by using shifts, adds, subtractions, and compares in a microprocessor. Other approximations can supply greater (or less) accuracy with additional (or less) computation.

A 64 entry table lookup for the cosine function in equation (6) plus the approximation in equations (7)–(10) to the square root of the sum of the squares for equation (4) gives errors less than 6% for base station latitudes of less than 60 degrees.

As mentioned above, the use of equations (4)–(10) are an approximation to the exact method of computing distance between base stations. An exact method of computing distance for a circular earth model can be defined by the following equations (11)–(16). The exact distance method has the mobile station register again if:

$$d_r \leq \text{distance} \tag{11}$$

where:

$$\text{distance} = \frac{180}{\lambda} \sqrt{(-\sin\phi\cos\theta + \sin\alpha\cos\beta)^2 + (\cos\phi\cos\theta + \cos\alpha\cos\beta)^2 + (\sin\theta - \sin\beta)^2} \tag{12}$$

$$\theta = \frac{\pi \text{ new } long}{180}; \tag{13}$$

$$\theta = \frac{\pi \text{ new } lat}{180}; \tag{14}$$

$$\alpha = \frac{\pi \text{ registered } long}{180}; \text{ and} \tag{15}$$

$$\beta = \frac{\pi \text{ registered } lat}{180}. \quad (16)$$

In the above equations (4)–(16) the parameters new long, new lat, registered long and registered lat, are given in degrees.

Turning now to an implementation of the distance method of the present invention, FIG. 1 illustrates an exemplary cellular communication system cell network or structure. With respect to the exemplary cell structure illustrated in FIG. 1, it should be understood that in the actual cellular communication environment cells may vary in size and in shape. It should further be understood that cells may tend to overlap with cell boundaries defining a cell of a shape different from than the ideal hexagon shape. Furthermore, cells may also be sectorized such as into three sectors, as is well known in the art. The cellular system of FIG. 1 may be an analog or digital communication system and employ one or more of several types of multiple access modulation schemes such as Code Division Multiple Access (CDMA), Time Division Multiple Access (TDMA) or Frequency Modulation (FM).

Figure 2:
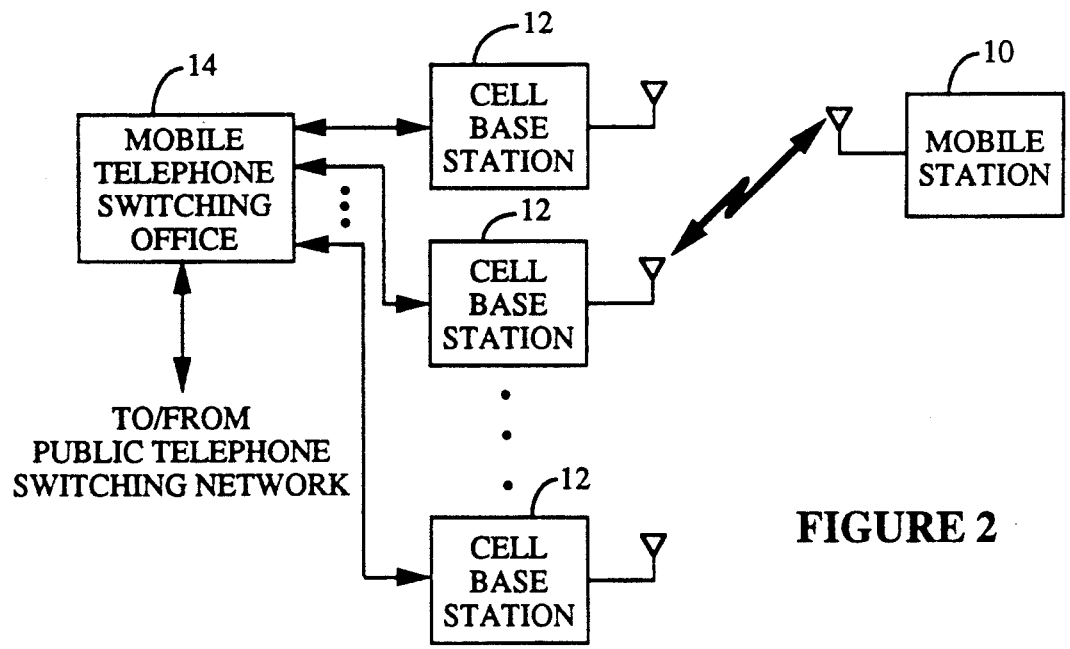
FIG. 2 is a block diagram illustrating the communication equipment for a cellular system.

Referring to FIG. 2, when mobile station 10 registers it typically transmits, via its transceiver, identification parameters which for example may include mobile station serial number and associated telephone number or numbers. The registration information is received at a transceiver located at a cell-site or base station 12 for the cell in which mobile station 10 is located. The registration information is relayed on to mobile telephone switching office (MTSO) 14 by the receiving base station 12.

One function of MTSO 14 is to route calls between the Public Switched Telephone Network and various cells as is well known in the art. MTSO 14 typically also contains a database relative to the cell structure. Upon mobile station registration in a particular cell, MTSO 14, using a processor and the cell structure database, determines in conjunction with the registration cell other associated cells so as to form a paging region or zone. The cells in the paging zone correspond to the registration cell and cells within a predetermined distance of the registration cell. This distance corresponds to a distance value transmitted by the registration cell as discussed below in further detail. Upon receiving a call intended for mobile station 10, MTSO 14 pages for mobile station 10 in the determined zone.

In an alternative scheme, MTSO 14 can merely note the cell in which mobile station 10 registered. Upon such time that mobile station 10 need be paged, MTSO 14 retrieves the information relative to the noted cell in which mobile station 10 registered. MTSO then determines, using the cell structure database information and the registration cell information, the cells forming the relevant paging zone.

In the conventional fixed zone method as described above, the registration of the mobile station typically occurs at a zone boundary cell or at some cell within the zone upon mobile station power-up. In the distance method of the present invention, mobile station registration creates a self-centering "floating" zone about the cell in which the mobile station registers.

When mobile station 10 initially powers-up in the system, or has travelled a predetermined distance from the cell in which it previously registered, preferably a distance sufficient to place mobile station 10 in a new cell, it registers in the new cell. The new cell in which mobile station 10 registers again becomes the center of a new zone.

In the present invention the size of the zone is determined by a distance value, which is typically communicated to the mobile station by the base station as cell information. Each cell base station transmits on a paging channel the cell information. The cell information includes in addition to the distance value base station location information, typically latitude and longitude.

When a call intended for transfer to mobile station 10 is received at MTSO 14, MTSO 14 initiates a mobile station page. MTSO 14 instructs the cells corresponding to the zone in which mobile station 10 is registered to transmit a paging message. The paging message is used to alert mobile station 10 that a call has been placed thereto. If received, mobile station 10 responds to the paged message by transmitting a response message to base station 12 in the cell in which mobile station is located. The response message is typically transferred by the receiving base station 12 and on to MTSO 14.

Upon receipt of mobile station 10 transmitted response, base station 12 typically transmits a page acknowledgement message to mobile station 10. The page acknowledgement message may originate at either MTSO 14 or base station 12. Besides notifying mobile station 10 that the response to the page was received, the acknowledgement message may also contain other information.

The response message as transferred by the receiving base station 12 is used by MTSO 14 to determine the cell in which mobile station 10 is currently within. MTSO 14 in coordination with receiving base station 12 directs the call to mobile station 10.

In the example illustrated by FIG. 1, mobile station 10 registers in cell $C1_A$. Registration in cell $C1_A$ may be because mobile station 10 has exceeded the distance value from another cell or due to a mobile station power-up from an unpowered condition. In a power-up situation a determination is made whether cell information from a previous registration has been stored in a memory in mobile station 10, with the information being retrieved. Should there be no cell information stored, such as in the case of an initial power-up of mobile station 10, mobile station 10 registers. However, should mobile station 10 have stored cell information from a previous registration, a determination is made as to whether a registration is required based upon the stored cell information and received cell information of the current cell in which mobile station 10 is located.

The distance registration process involves retrieving from the mobile station memory the stored cell information for the cell in which a previous registration occurred. Cell information is received from the base station for the cell in which mobile station 10 is located. Using the method described with reference to equations (4)–(6) the following steps are performed in the mobile station processor to determine whether a registration is required. In accordance with equation (5), the stored latitude is subtracted from the current cell latitude to obtain the value $\Delta lat$. In accordance with equation (6), the stored longitude is subtracted from the current cell longitude, with the result multiplied by the cosine factor, to obtain the value $\Delta long$. In accordance with equation (4), the values Δlat and Δlat are respectively squared, with the squared values summed and the square root of the sum taken to arrive at a resultant distance value $d_m$. The resultant distance value $d_m$ is then compared with the stored distance parameter $d_r$. Should the distance value $d_m$ be greater than or equal to the stored distance parameter $d_r$, mobile station 10 registers as discussed above.

When mobile station 10 registers for a first time and upon each subsequent registration, the cell information for the cell in which registration is occurs is stored in memory. Upon a power-down of mobile station 10 the cell information corresponding to the cell in which mobile station 10 last registered stored in a memory, preferably a non-volatile memory, so as to be preserved for use upon mobile station power-up.

In registering, mobile station 10 transmits its registration information to base station 12 corresponding to the cell in which mobile station 10 is located. Base station 12 responds by transmitting an registration acknowledgement message to mobile station 10 as an indication that the registration message was received. The registration acknowledgement message may also contain information indicative of an acceptance or rejection of the use of the system by mobile station 10.

Referring to FIG. 1, in the registering of mobile station 10 in cell $C1_A$, all cells within a predetermined range or distance $d_r$ of cell $C1_A$ form a paging zone for mobile station 10 as indicated by the circle 16. All base stations 12 at cells within the paging zone are instructed by MTSO 14 to page mobile station 10 when a call is to be directed thereto. In the case where mobile station 10 registers in cell $C1_A$, the page is also transmitted by the base station 12 in each of cells $C1_A$–$C1_S$ within the paging zone centered about cell $C1_A$.

Upon registration in cell $C1_A$, mobile station 10 stores the cell information, base station latitude and longitude information, along with the distance value for cell $C1_A$. As mobile station 10 travels through the cellular system, for example along the path indicated by dashed line 18, it listens for a mobile station page and for cell information about the cells through which it passes. As mobile station 10 moves from cell to cell it receives the corresponding cell latitude and longitude information, and distance value. The current cell latitude and longitude values along with the stored latitude, longitude and distance values are used in accordance with equations (4)–(6) by mobile station 10 to determine whether the distance it has travelled since registration exceeds the stored distance value $d_r$.

Should mobile station 10 determine that the distance travelled exceeds the stored distance value $d_r$, then mobile station 10 again registers. As illustrated in FIG. 1, when mobile unit 10 enters cell $C2_A$, a cell whose base station 12 is located a distance greater than a distance $d_r$ to base station 12 of cell $C2_A$, mobile station 10 registers in cell $C2_A$. In registering in cell $C2_A$, all cells within a predetermined distance d of the base station 12 of cell $C2_A$ form a new "floating" zone as indicated by the circle 20. All base stations within each cell within the new zone are instructed by MTSO 14 to page mobile station 10 when a call is to be directed thereto. As was for the previous registration in cell $C1_A$ the page is also transmitted by a base station in each of cells $C2_A$–$C2_S$ within the new zone centered about cell $C2_A$.

It should be noted that the distance travelled by mobile station 10 for purposes of determining whether registration in the new cell is required is not based upon the actual distance travelled by mobile station 10. The distance travelled for purposes of registration is based upon a difference in the locations of the cell base stations. Mobile station 10, no matter where located in a cell, is for purposes of registration assumed to have the coordinates of the cell base station of the cell in which the mobile station is currently present.

For example, when mobile station 10 registers in cell $C1_A$ is assumes the coordinates of base station 12 in cell $C1_A$. When mobile station 10 enters in another cell, such as cell $C1_F$, it assumes the coordinates of base station 12 of cell $C1_F$. When mobile station 10 enters cell $C2_A$ it again assumes the corresponding coordinates of base station 12 of cell $C2_A$. Although mobile station 10 may not have travelled the actual distance $d_r$ when it enters cell $C2_A$, the mere fact that the computed distance between the base stations 12 of cells $C1_A$ and $C2_A$ exceeds the distance value $d_r$ causes mobile station 10 to register again.

Therefore circles 16 and 20 are merely representative of the floating zone boundaries associated with mobile station 10. A more accurate representation of the boundaries of the self-centering "floating" zones are illustrated by the darker cell boundary lines 22 and 24 respectively associated with each of circles 16 and 20.

As discussed above the base stations transmit latitude and longitude information for purposes of registration determination. It is envisioned that other coordinates systems may be used in a similar manner. For example, a cellular system grid pattern or coordinate system may be constructed with base stations transmitting corresponding grid coordinates.

For purposes of analysis of the distance method, a homogeneous network of cells such as illustrated in FIG. 1 is considered. The mobile station is configured to register upon a power-up, if necessary, or whenever it enters a particular ring of cells based distance travelled from a previous registration. Assuming homogeneous vehicle movement in the network, semi-Markov techniques can be used to determine the expected registration rate. While movement from cell to cell is ordinarily a high order Markov chain, a simple model can be obtained by assuming a first order Markov chain with the mobile station entering any of the surrounding cells with probability equal to 1/6.

Figure 3:
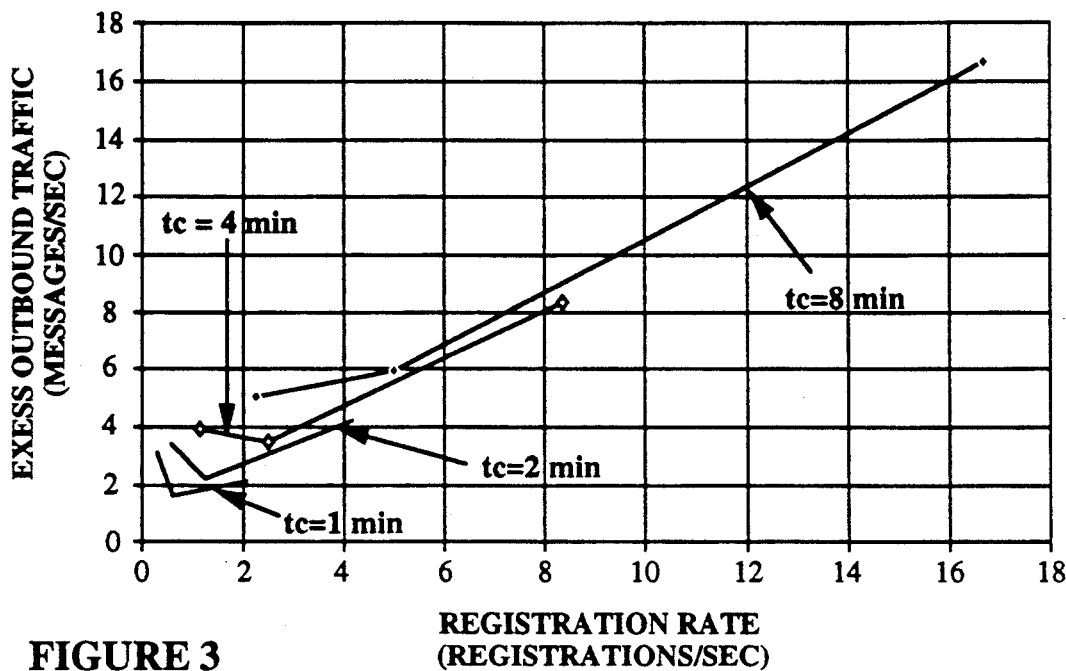
FIG. 3 is a graph illustrating excess outbound rate versus the registration rate for a cell for the distance method of the present invention.

FIG. 3 illustrates in graphical form the excess outbound rate as a function of the registration rate for four different values of $t_c$, defined as the expected time that a mobile station takes to enter cell i given that it just entered cell j. The analysis resulting in the graph of FIG. 3 assumes 1000 mobile stations per cell so that a direct scaling can be used for different numbers of mobile stations per cell. The marked points in FIG. 3 correspond to registering when the mobile station enters the first, second, or third ring of cells; a straight line has been drawn between the points to highlight the shape of the curve. It should be understood that in using FIG. 3 the values must be scaled to portray an environment for physically realistic vehicle movement. For example, it is nearly impossible to have 1000 mobile stations cross a cell in 1 minute as illustrated in the figure.

Figure 4:
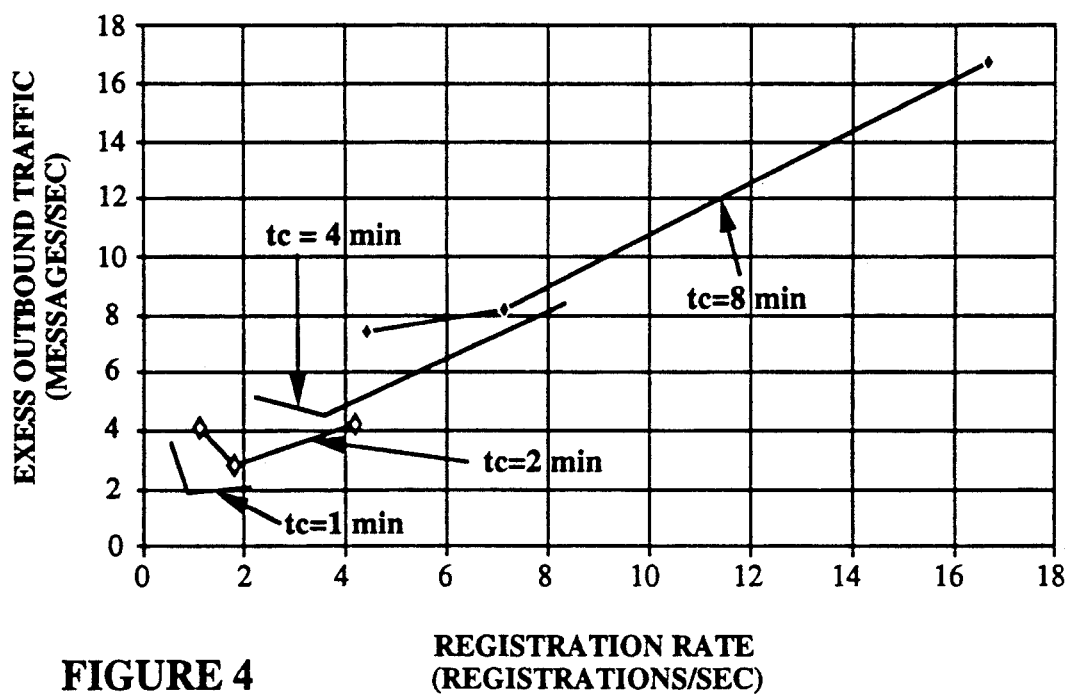
FIG. 4 is a graph illustrating excess outbound rate versus the registration rate for a perimeter cell in the zone for the zone method.

In comparison with FIG. 3, FIG. 4 shows the excess outbound rate versus the registration rate for a perimeter cell in the zone in a system using the zone method. For purposes of analysis only a single zone is allowed on the mobile station's zone list. The homogeneous network and the semi-Markov model described with reference to FIG. 3 was again used.

For a given excess outbound rate and with the semi-Markov model, the registration rate for the distance method tends to be less than for the zone method. A lower excess outbound rate is realized for the distance method because a circular region, or "floating" zone, is built around the cell where the mobile station last registered.

With the zone method, the mobile station has a shorter expected distance to traverse before entering a new zone as it registers in a perimeter cell. In practice, there are multiple zones on a zone list. A multiple zone zone list is employed so that the mobile station does not register multiple times as it flips between cells along the zone boundary. Consequently, the system may have to page the mobile station in multiple zones. This results in the distance method being even more favorable when vehicular traffic follows the above discussed model.

In the zone method, the perimeter cells of a zone have high registration rates while interior cells have low registration rates. This can lead to an imbalance in the capacity of cells. By having multiple groups of mobile stations and staggering zones relative to each other for each group, the registration rate can be made more homogeneous in the network. However, this defeats the often desirable property of having a well defined zone boundary. Assuming a homogeneous network, the distance method has equal registration rates in all cells. This will not strictly hold in most networks as mobile stations will tend to initialize registration in certain cells.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. In a cellular communication system defined by a plurality of cells, a method for establishing mobile station paging zones in said cellular communication system comprising the steps of:
   transmitting, in each one of said cells, a respective cell location information and distance value;
   receiving at a mobile station location information and distance value for a current cell in which said mobile station is currently located;
   computing a distance between said current cell and a previous cell in which said mobile station registered;
   transmitting mobile station registration information when said computed distance is at least a distance value for said previous cell; and
   determining from said transmitted mobile station registration information a group of cells within a distance of said current cell corresponding to said current cell distance value.

2. The method of claim 1 further comprising the steps of:
   storing, said, previous cell location information and distance value;
   retrieving said stored previous cell location information and distance value; and
   comparing said computed distance with said previous cell distance value.

3. The method of claim 1 further comprising the step of transmitting said mobile station registration information when said mobile station is lacking a registration in said previous cell.

4. In a cellular communication system, a method for reducing the number of cells in which paging for a mobile station is required, the method comprising the steps of:
   transmitting from each cell base station corresponding location information and a distance value;
   receiving at said mobile station, when located in a current cell, said current cell base station location information and distance value for said current cell;
   computing a distance between said current cell base station location and a previous cell base station location in which said mobile station previously registered;
   comparing said computed distance with a distance value corresponding to said previous cell base station;
   transmitting mobile station registration information to said current cell base station when said computed distance is at least said previous cell base station distance value;
   receiving at said current cell base station said mobile station registration information; and
   determining a group of cells within a distance of said current cell corresponding to said current cell distance value.

5. The method of claim 4 further comprising the steps of:
   storing in a non-volatile memory said previous cell base station location information and distance value;
   retrieving said stored previous base station location information from said memory for computing said distance;
   retrieving said stored previous base station distance value from said memory for comparing with said distance value.

6. The method of claim 4 further comprising the steps of:
   determining whether said mobile station has registered in any cell; and
   transmitting said mobile station registration information to said current cell base station when determined said mobile station has not registered in any cell.

7. The method of claim 5 wherein said each cell base station location information comprises latitude and longitude for said respective base station.

8. The method of claim 7 wherein said step of computing said distance between said current cell base station and said previous cell base station comprises the steps of:
   determining the difference between said current cell base station latitude and said previous cell base station latitude to provide a latitude difference value;
   determining the difference between said current cell base station longitude and said previous cell base station longitude to provide a longitude difference value;
   squaring each of said latitude difference value and said longitude difference value;

summing said squared latitude difference value and said squared longitude difference value to provide a sum value;

computing a square root of said sum value with the result thereof corresponding to said distance between said current cell base station and said previous cell base station.

9. The method of claim 5 further comprising the step of storing said current base station location information and distance value in said memory when said computed distance is as least said previous cell base station distance value.

10. The method of claim 6 further comprising the step of storing said current base station location information and distance value in said memory when determined said mobile station has not registered in any cell.

11. The method of claim 4 further comprising the step of transmitting a paging message from each cell within said group of cells.

12. In a cellular communication system in which a mobile station registers in a first cell and where said mobile station is provided location information of a first base station located in said first cell, a method for re-registration comprising the steps of:

communicating to said mobile station, by a second base station located in a second cell, location information of said second base station;

computing at said mobile station a distance between said first base station and said second base station; and registering by said mobile station in said second cell when said computed distance is greater than or equal to a predetermined distance value.

13. The method of claim 12 further comprising the steps of:

storing in a memory in said mobile station said location information of said first base station; and retrieving said first base station location information from said memory for computing said distance.

14. The method of claim 13 further comprising the step of storing said second base station location information in said memory when said computed distance is at least said predetermined distance value.

15. The method of claim 12 wherein said predetermined distance value is provided in said location information of said first base station.

16. The method of claim 14 wherein said predetermined distance value is provided in said location information of said first base station.

17. The method of claim 16 wherein a second predetermined distance value is provided in said location information of said second base station.

18. The method of claim 12 wherein said predetermined distance value is prestored at said mobile station.

19. The method of claim 12 wherein said location information of said first base station comprises a first base station latitude and a first base station longitude; and wherein said location information of said second base station comprises latitude and longitude for said second base station.

20. The method of claim 19 wherein said step of computing said distance between said first base station and said second base station comprises the steps of:

determining the difference between said second base station latitude and said first cell base station latitude to provide a latitude difference value;

determining the difference between said second base station longitude and said first base station longitude to provide a longitude difference value;

squaring each of said latitude difference value and said longitude difference value;

summing said squared latitude difference value and said squared longitude difference value to provide a sum value;

computing a square root of said sum value with the result thereof corresponding to said distance between said second base station and said first base station.

21. A method for mobile station registration in a cellular communication system comprising the steps of:

registering by a mobile station in a first cell;

transmitting to said mobile station when located in said first cell, by a first base station, located in said first cell, first base station location information;

transmitting to said mobile station when located in a second cell, by a second base station located in said second cell, second cell location information;

computing a distance between said first base station and said second base station; and registering by said mobile station in said second cell when said computed distance value is greater than or equal to a predetermined distance.

22. The method of claim 21 further comprising the steps of:

storing in a memory of said mobile station said first base station location information and a distance value; and retrieving said first base station location information and said distance value from said memory for computing said distance.

23. The method of claim 22 further comprising the step of storing said second base station location information in said memory when said computed distance is greater than or equal to said predetermined distance value.

24. The method of claim 21 wherein said location information of said first base station comprises latitude and longitude for said first base station; and wherein said location information of said second base station comprises latitude and longitude for said second base station.

25. The method of claim 24 wherein said step of computing said distance between said first cell base station and said second cell base station comprises the steps of:

determining the difference between said second base station latitude and said first base station latitude to provide a latitude difference value;

determining the difference between said second base station longitude and said first base station longitude to provide a longitude difference value;

squaring each of said latitude difference value and said longitude difference value;

summing said squared latitude difference value and said squared longitude difference value to provide a sum value; and computing a square root of said sum value with the result thereof corresponding to said distance between said second cell base station and said first cell base station.

26. In a cellular communication system defining a plurality of cells, a method for establishing mobile station paging zones in said plurality of cells, comprising the steps of:

transmitting, in predetermined ones of said cells, respective cell location information;

receiving at a mobile station, when located in a current cell, said current cell transmitted location information;

computing a distance between said current cell and a previous one of said cells in which said mobile station previously registered;

transmitting mobile station registration information when said computed distance is greater than or equal to a predetermined distance value; and determining from said transmitted mobile station registration information a group of cells within a distance of said current cell corresponding to said current cell distance value.

27. The method of claim 26 further comprising the steps of:

storing in a non-volatile memory location information for said previous one of said cells and said distance value;

retrieving said location information for said previous one of said cells from said memory for computing said distance; and retrieving said predetermined distance value from said memory for comparing with said computed distance value.

28. The method of claim 27 further comprising the step of storing said current cell location information value in said memory when said computed distance is greater than or equal to said predetermined distance value.

29. The method of claim 26 wherein said location information of said previous one of said cells comprises latitude and longitude for said previous one of said cells; and wherein said location information of said current cell comprises latitude and longitude for said current cell.

30. The method of claim 29 wherein said step of computing said distance between said first cell and said second cell comprises the steps of:

determining the difference between said second cell latitude and said first cell latitude to provide a latitude difference value;

determining the difference between said second cell longitude and said first cell longitude to provide a longitude difference value;

squaring each of said latitude difference value and said longitude difference value;

summing said squared latitude difference value and said squared longitude difference value to provide a sum value; and computing a square root of said sum value with the result thereof corresponding to said distance between said second cell base station and said first cell.

31. The method of claim 26 further comprising the step of transmitting a paging message from each cell within a predetermined group of cells.

32. A cellular communication system comprising:

a plurality of base stations each defining a cell, for providing location information to a mobile station;

said mobile station for receiving location information from each respective one of said base stations when located within a corresponding one of said cells, providing registration information to a first base station of said plurality of base stations computing a distance between said first base station of said plurality of base stations and a current base station of said plurality of said base stations based upon said location information and if said distance exceeds a predetermined value, providing registration information to said current base station.

33. The system of claim 32 further comprising a system controller for receiving registration information provided thereto by each base station of said plurality of base stations and said system controller for determining from said registration information a set of base stations to form a paging group for said mobile station.

* * * * *